United States Patent
Seitz-Paquette et al.

(10) Patent No.: US 11,910,161 B2
(45) Date of Patent: Feb. 20, 2024

(54) HEARING ASSISTANCE SYSTEMS AND METHODS FOR USE WITH ASSISTIVE LISTENING DEVICE SYSTEMS

(71) Applicant: Starkey Laboratories, Inc., Eden Prairie, MN (US)

(72) Inventors: Kevin D. Seitz-Paquette, Minneapolis, MN (US); Andrew Johnson, Edina, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 171 days.

(21) Appl. No.: 17/637,733

(22) PCT Filed: Aug. 21, 2020

(86) PCT No.: PCT/US2020/047349
§ 371 (c)(1),
(2) Date: Feb. 23, 2022

(87) PCT Pub. No.: WO2021/041191
PCT Pub. Date: Mar. 4, 2021

(65) Prior Publication Data
US 2022/0286789 A1 Sep. 8, 2022

Related U.S. Application Data

(60) Provisional application No. 62/890,995, filed on Aug. 23, 2019.

(51) Int. Cl.
*H04R 25/00* (2006.01)

(52) U.S. Cl.
CPC ......... *H04R 25/505* (2013.01); *H04R 25/554* (2013.01); *H04R 25/558* (2013.01); *H04R 2225/55* (2013.01)

(58) Field of Classification Search
CPC ...... H04R 25/55; H04R 25/554; H04R 27/02; H04R 2225/55; H04R 2460/07
See application file for complete search history.

(56) References Cited

U.S. PATENT DOCUMENTS 4,920,570 A * 4/1990 West ............... H04R 25/502
340/4.11
5,844,522 A 12/1998 Sheffer et al.
(Continued)

FOREIGN PATENT DOCUMENTS

WO 2021041191 3/2021

OTHER PUBLICATIONS

"ALD Locator," Assistive Listening Device Locator website URL<aldlocator.com> available at least as early as 2017 and associated mobile app available in apple and google play stores (2 pages).
(Continued)

*Primary Examiner* — Ryan Robinson
(74) *Attorney, Agent, or Firm* — Pauly, DeVries Smith & Deffner LLC

(57) ABSTRACT

Embodiments herein relate to hearing assistance systems and methods for use with assistive listening device systems. In a first aspect, a hearing assistance system is included having an ear-worn device can include a control circuit, a sensor package in signal communication with the control circuit, a power supply circuit in electrical communication with the control circuit, and a spatial locator circuit in communication with the ear-worn device. The spatial locator circuit can detect a current spatial location. The system can compare the current spatial location against entries in a database of spatial locations that offer assistive listening device services. The system can send a notification to the ear-worn device and/or ear-worn device wearer if the current spatial location is found in the database of spatial locations (Continued)

that offer assistive listening device services. Other embodiments are also included herein.

20 Claims, 10 Drawing Sheets

(56) References Cited

U.S. PATENT DOCUMENTS

| | | | | |
|---|---|---|---|---|
| 5,883,927 | A | * | 3/1999 | Madsen ................ H04B 15/02 381/94.1 |
| 6,169,498 | B1 | | 1/2001 | King et al. |
| 7,383,052 | B2 | | 6/2008 | Moton et al. |
| 7,787,857 | B2 | | 8/2010 | Peterman |
| 8,559,663 | B1 | * | 10/2013 | Sacha ................ H04M 1/6066 381/315 |
| 11,304,013 | B2 | * | 4/2022 | Burwinkel ............ G10L 13/086 |
| 2011/0293123 | A1 | | 12/2011 | Neumeyer et al. |
| 2014/0193007 | A1 | * | 7/2014 | Solum ................ H04R 25/40 381/313 |
| 2015/0271607 | A1 | | 9/2015 | Sabin |
| 2023/0247373 | A1 | * | 8/2023 | Burwinkel ............ H04R 25/554 381/312 |
| 2023/0297320 | A1 | * | 9/2023 | Abildgren ............ H04W 4/021 381/77 |

OTHER PUBLICATIONS

"International Preliminary Report on Patentability," for PCT Application No. PCT/US2020/047349 dated Mar. 3, 2022 (9 pages).
"International Search Report and Written Opinion," for PCT Application No. PCT/US2020/047349 dated Nov. 26, 2020 (13 pages).

* cited by examiner

HEARING ASSISTANCE SYSTEMS AND METHODS FOR USE WITH ASSISTIVE LISTENING DEVICE SYSTEMS

This application is being filed as a PCT International Patent application on Aug. 21, 2020, in the name of Starkey Laboratories, Inc., a U.S. national corporation, applicant for the designation of all countries, and Kevin D. Seitz-Paquette, a U.S. Citizen, and Andrew Johnson, a U.S. Citizen, inventors for the designation of all countries, and claims priority to U.S. Provisional Patent Application No. 62/890,995 filed Aug. 23, 2019, the contents of which are herein incorporated by reference in its entirety.

FIELD

Embodiments herein relate to hearing assistance systems and methods. More specifically, embodiments herein relate to hearing assistance systems and methods for use with assistive listening device systems.

BACKGROUND

Hearing aids and cochlear implants may be insufficient in public spaces such as auditoriums, places of worship, conference rooms, theaters, concert halls, airports, restaurants, transportation hubs, pharmacy counters, bank teller windows, customer service desks and more.

Assistive listening device (ALD) services can dramatically improve the experiences of people with hearing loss in environments where they are offered. Assistive listening device services bridge the gap between a device wearer and the sound source by directly sending sound to the device wearer's ears, thus eliminating or attenuating the effects of distance, background noise, reverberation and other challenging acoustics.

Assistive listening device (ALD) services are offered in many venues such as auditoriums, places of worship, conference rooms, theaters, concert halls, airports, restaurants, transportation hubs, pharmacy counters, bank teller windows, customer service desks, and the like. Common ALD systems include hearing loops (or telecoil loop systems), infrared systems, and FM systems. Hearing Loops, also known as Induction Loops or Audio Frequency Induction Loop Systems (AFILS), typically consist of a copper wire placed within a room, theater, or counter that is connected to a public address or sound system. An electromagnetic field is created that connects to a telecoil (typically an inductive receiver) in hearing aids, cochlear implants, or dedicated telecoil receivers. Users simply switch their devices to an ALD operational mode and then receive clear, customized sound directly to their ears.

SUMMARY

Embodiments herein relate to hearing assistance systems and methods for use with assistive listening device systems. In a first aspect, a hearing assistance system is included having an ear-worn device can include a control circuit, a sensor package in signal communication with the control circuit, a power supply circuit in electrical communication with the control circuit, and a spatial locator circuit in communication with the ear-worn device. The spatial locator circuit can detect a current spatial location. The system can compare the current spatial location against entries in a database of spatial locations that offer assistive listening device services. The system can send a notification to the ear-worn device and/or ear-worn device wearer if the current spatial location is found in the database of spatial locations that offer assistive listening device services.

In a second aspect, in addition to one or more of the preceding or following aspects, or in the alternative to some aspects, the spatial location circuit can be integrated within a housing with the ear-worn device.

In a third aspect, in addition to one or more of the preceding or following aspects, or in the alternative to some aspects, the ear-worn device can be physically separate from but in wireless communication with the spatial locator circuit.

In a fourth aspect, in addition to one or more of the preceding or following aspects, or in the alternative to some aspects, the hearing assistance system can send a notification to the ear-worn device wearer if the current spatial location is found in the database of spatial locations that offer assistive listening device services.

In a fifth aspect, in addition to one or more of the preceding or following aspects, or in the alternative to some aspects, the hearing assistance system can prompt the ear-worn device wearer to enter an ALD operating mode if the current spatial location is found in the database of spatial locations that offer assistive listening device services.

In a sixth aspect, in addition to one or more of the preceding or following aspects, or in the alternative to some aspects, the prompt can be delivered through the ear-worn device.

In a seventh aspect, in addition to one or more of the preceding or following aspects, or in the alternative to some aspects, the prompt can be delivered through a personal communications device in wireless communication with the ear-worn device.

In an eighth aspect, in addition to one or more of the preceding or following aspects, or in the alternative to some aspects, the hearing assistance system monitors for a command from the ear-worn device wearer to enter an assistive listening device mode after sending a notification to the ear-worn device wearer.

In a ninth aspect, in addition to one or more of the preceding or following aspects, or in the alternative to some aspects, the spatial locator circuit forms a part of a personal communications device.

In a tenth aspect, in addition to one or more of the preceding or following aspects, or in the alternative to some aspects, the spatial locator circuit can include a satellite signal receiver circuit.

In an eleventh aspect, in addition to one or more of the preceding or following aspects, or in the alternative to some aspects, the spatial locator circuit can include a device-to-device locator circuit.

In a twelfth aspect, in addition to one or more of the preceding or following aspects, or in the alternative to some aspects, the spatial locator circuit can include an electromagnetic sensor to detect the presence of a telecoil loop cable.

In a thirteenth aspect, in addition to one or more of the preceding or following aspects, or in the alternative to some aspects, the hearing assistance system can prompt the ear-worn device wearer to assent to adding a current spatial location to the database of spatial locations that offer assistive listening device services if the hearing assistance device system detects the presence of assistive listening device (ALD) services in the current spatial location.

In a fourteenth aspect, in addition to one or more of the preceding or following aspects, or in the alternative to some aspects, the assistive listening device (ALD) services can be selected from the group consisting of a telecoil loop system, an FM transmitter/receiver system, a personal audio device system, a BLUETOOTH® ALD system, and an infrared ALD system.

In a fifteenth aspect, an ear-worn device is included having a control circuit, a sensor package in signal communication with the control circuit, a power supply circuit in electrical communication with the control circuit, and a spatial locator circuit in signal communication with the control circuit. The spatial locator circuit can detect a current spatial location of the ear-worn device. The control circuit can compare the current spatial location against entries in a database of spatial locations that offer assistive listening device services. The ear-worn device can initiate a notification to the ear-worn device wearer if the current spatial location is found in the database of spatial locations that offer assistive listening device services.

In a sixteenth aspect, an ear-worn device accessory is included having a control circuit, a power supply circuit in electrical communication with the control circuit, and a spatial locator circuit in signal communication with the control circuit. The spatial locator circuit can detect a current spatial location of the ear-worn device accessory. The control circuit can compare the current spatial location against entries in a database of spatial locations that offer assistive listening device services. The ear-worn device accessory can initiate a notification to an ear-worn device wearer if the current spatial location is found in the database of spatial locations that offer assistive listening device services.

In a seventeenth aspect, in addition to one or more of the preceding or following aspects, or in the alternative to some aspects, the ear-worn device accessory can include or be a personal communications device.

In an eighteenth aspect, in addition to one or more of the preceding or following aspects, or in the alternative to some aspects, the ear-worn device accessory can initiate a notification to an ear-worn device if the current spatial location is found in the database of spatial locations that offer assistive listening device services.

In a nineteenth aspect, a method of operating a hearing assistance system is included, the method including determining a current spatial location of one or more components of a hearing assistance system, comparing the current spatial location against entries in a database of spatial locations that offer assistive listening device services, and sending a notification to an ear-worn device and/or an ear-worn device wearer if the current spatial location is found in the database of spatial locations that offer assistive listening device services.

In a twentieth aspect, in addition to one or more of the preceding or following aspects, or in the alternative to some aspects, wherein the hearing assistance system prompts the ear-worn device wearer to enter an ALD operating mode if the current spatial location is found in the database of spatial locations that offer assistive listening device services.

In a twenty-first aspect, in addition to one or more of the preceding or following aspects, or in the alternative to some aspects, the hearing assistance system monitors for a command from the ear-worn device wearer to enter an assistive listening device mode (or ALD operating mode) after sending a notification to the ear-worn device wearer.

In a twenty-second aspect, in addition to one or more of the preceding or following aspects, or in the alternative to some aspects, the hearing assistance system prompts the ear-worn device wearer to assent to adding a current spatial location to the database of spatial locations that offer assistive listening device services if the hearing assistance device system detects the presence of assistive listening device (ALD) services in the current spatial location.

In a twenty-third aspect, in addition to one or more of the preceding or following aspects, or in the alternative to some aspects, a method of operating a hearing assistance system is included. The method can include determining a current spatial location of one or more components of a hearing assistance system, the hearing assistance system comprising an ear-worn device. The method can also include detecting a device wearer command for the ear-worn device to enter an ALD services operating mode. The method can also include sending a request to add the current spatial location to a database of spatial locations that offer assistive listening device services.

In a twenty-fourth aspect, in addition to one or more of the preceding or following aspects, or in the alternative to some aspects, a method herein can include prompting the ear-worn device wearer to assent to send the request.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As described above, many attractions, environments, etc. offer assistive listening device (ALD) services in order to provide people who may come thereto with a better listening experience. However, while signs may be posted regarding the availability of ALD services, it can be very easy for a device wearer to miss these signs, especially in the context of a crowded environment. If the device wearer is completely unaware of the availability of ALD services, it is unlikely they will take advantage of them and receive their benefits.

Embodiments herein can improve usage of ALD services by providing notifications to a device wearer of the availability of ALD services. In some embodiments, ear-worn device wearers can also improve and/or update database(s) of spatial locations offering ALD services by contributing their current spatial location (with their assent) and ALD services status in the current spatial location to update a database containing information on spatial locations that offer ALD services. Thus systems herein allow device wearers to take advantage of ALD services more consistently and more often and also can offer the opportunity to improve ALD services availability mapping to contribute to providing better experiences for others as well.

Figure 1:
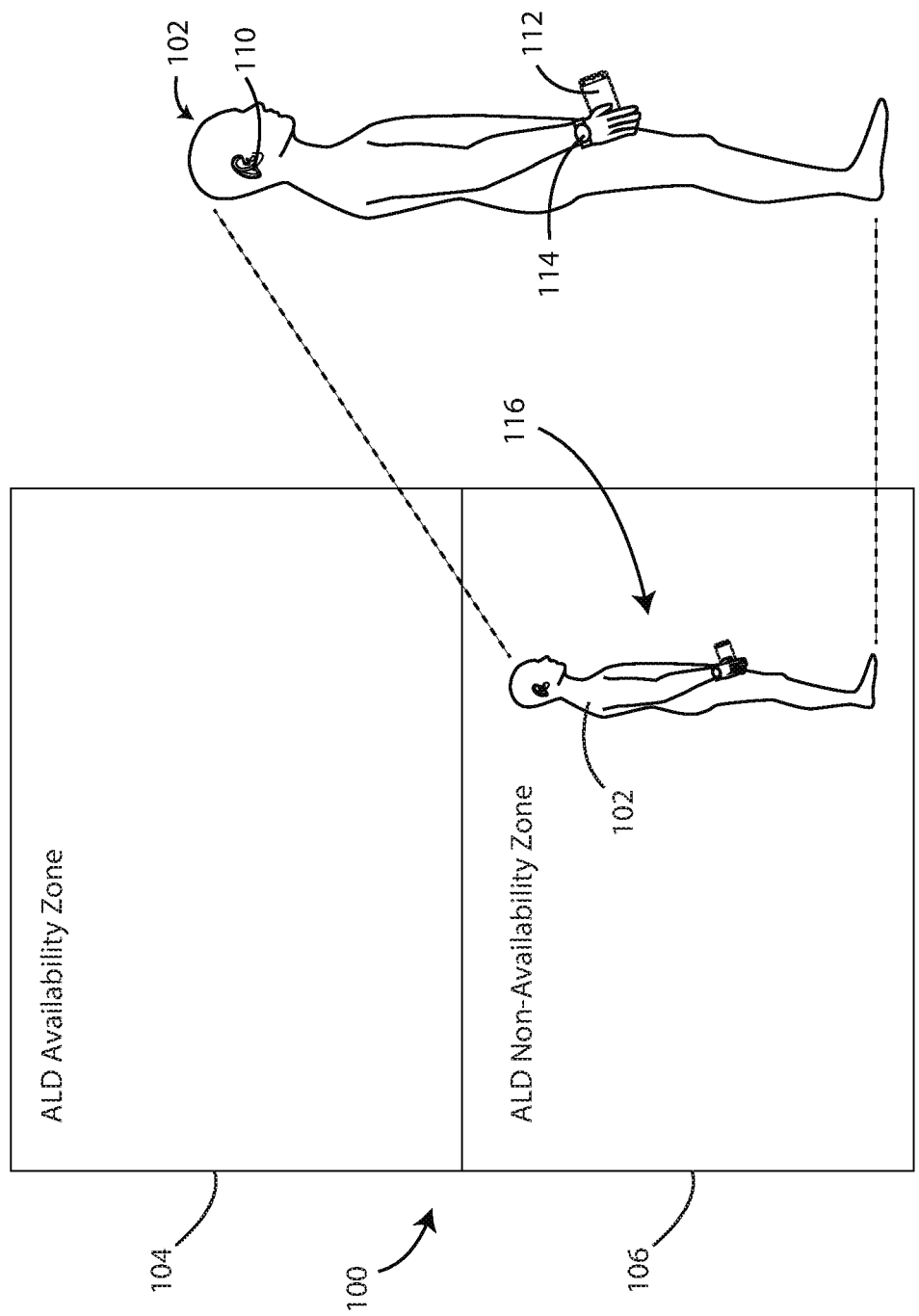
FIG. 1 is a schematic view of an ear-worn device wearer within an environment including different zones in accordance with various embodiments herein.

Referring now to FIG. 1, a schematic view of an ear-worn device wearer 102 within an environment 100 including different zones is shown in accordance with various embodiments herein. The environment 100 includes an ALD (assistive listening device services) availability zone 104. The environment 100 also includes an ALD non-availability zone 106. The zones shown in FIG. 1 are schematic, not to scale, and only provided by way of example. It will be appreciated that in reality zones are frequently quite large and may be irregularly shaped. ALD availability zones 104 may cover a spatial area of any particular size from hundreds to tens of thousands of square feet.

Components of a hearing assistance system are shown in FIG. 1, for purposes of schematic illustration, within a current spatial location 116. In order to determine whether the current spatial location 116 is within an ALD availability zone 104 or an ALD non-availability zone 106, the current spatial location 116 can be compared with entries in a database of spatial locations that offer assistive listening device services. If a match if found then various steps can be taken as described further below, such as a notification can be provided to the device wearer regarding the availability of ALD services.

It will be appreciated that comparing the current spatial location 116 with entries in a database can happen in various ways. In some embodiments, coordinates of the current spatial location can be compared with zone boundaries stored in a database and if the current coordinates are found to fall within a zone that is believe to offer ALD services then a "match" is found and various steps can be taken to notify the device wearer or other steps can be followed as described herein. In some embodiments, location can be determined and checked against a database even without coordinates. For example, a referential signal (e.g., an identifiable WIFI network signal, etc.) or a device in the current spatial location (e.g., a beacon, etc.) can be detected by the hearing assistance system and then the referential signal or device can be compared with records of a database that stores known referential signals or devices. If a match is found (e.g., the database indicates that the particular referential signal or device is associated with ALD service availability) then various steps can be taken to notify the device wearer or other steps can be followed as described herein.

Hearing assistance systems herein can include various components. In some embodiments, hearing assistance device systems herein include an ear-worn device 110. In various embodiments, the ear-worn device 110 can initiate a notification to the ear-worn device wearer or to another system component or another device if the current spatial location (by coordinates, referential signal, referential device, etc.) is found in a database of spatial locations that offer assistive listening device services. In other embodiments, other components of the system can initiate a notification to the ear-worn device wearer or to another system component or another device if the current spatial location 116 (of the ear-worn device 110, or an ear-worn device accessory 114, or a personal communications device 112, etc.) is found in a database of spatial locations that offer assistive listening device services.

In various embodiments, the personal communications device 112, an ear-worn device accessory 114, or another device can be in wireless communication with the ear-worn device 110. In various embodiments, the ear-worn device accessory 114 initiates a notification to an ear-worn device 110 wearer if the current spatial location 116 is found in the database of spatial locations that offer assistive listening device services. In various embodiments, the ear-worn device accessory 114 initiates a notification to an ear-worn device 110 if the current spatial location 116 is found in the database of spatial locations that offer assistive listening device services.

Many different assistive listening device (ALD) services can be used with embodiments herein. In various embodiments, the assistive listening device (ALD) services can include at least one of a telecoil loop system, an FM transmitter/receiver system, a personal audio device system, a BLUETOOTH® ALD system, an infrared ALD system, and the like.

Figure 2:
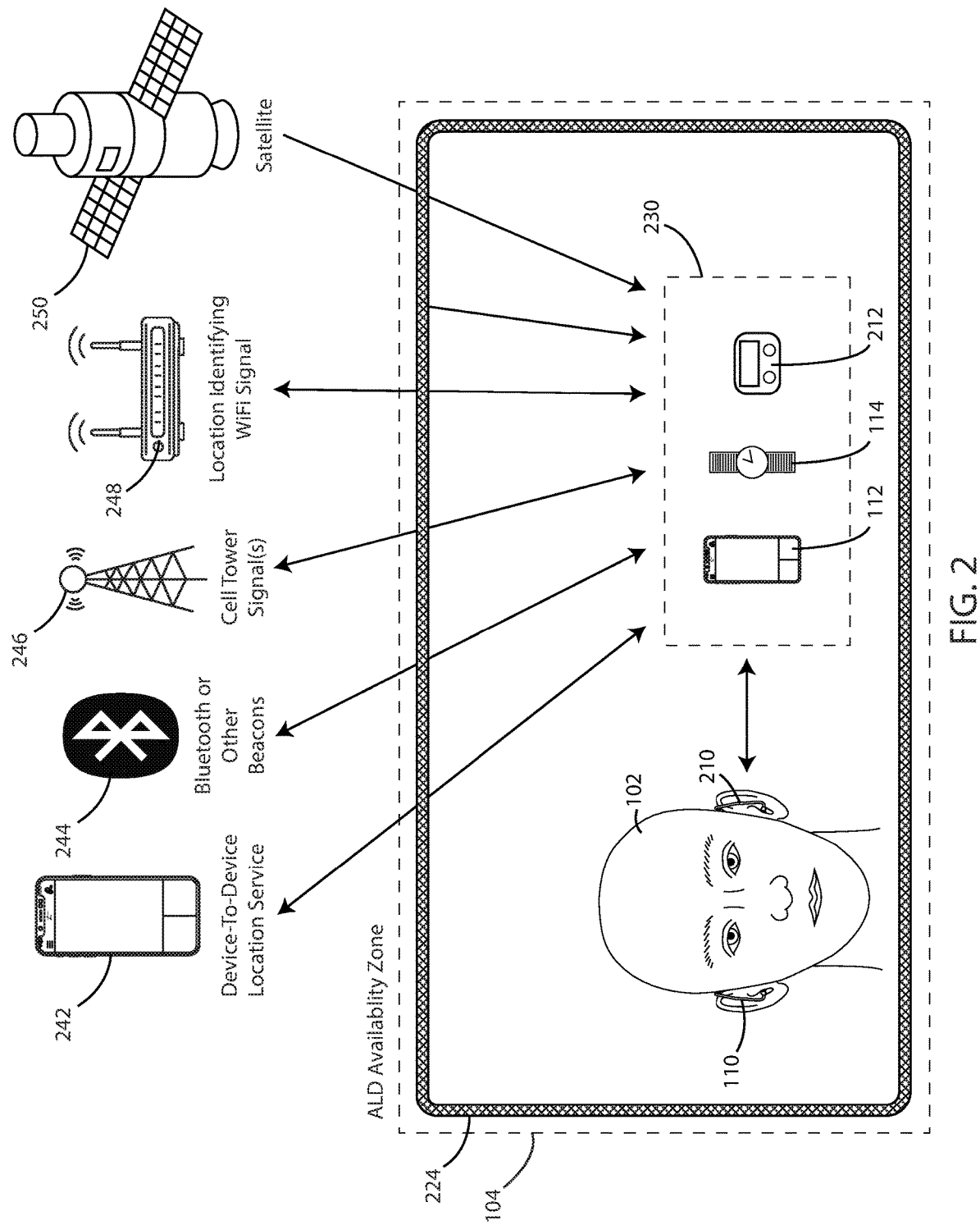
FIG. 2 is a schematic view of components of a hearing assistance system in accordance with various embodiments herein.

It will be appreciated that a current spatial location can be determined in various ways. Referring now to FIG. 2, a schematic view is shown of components of a hearing assistance system in accordance with various embodiments herein. In this view, an ear-worn device wearer 102 is shown inside of an ALD availability zone 104.

A hearing assistance system includes an ear-worn device 110. The hearing assistance system also includes a second ear-worn device 210. The system can include a spatial locator circuit (described further below). The spatial locator circuit can be a part of at least one spatial location determining device 230 (of which there are many examples). The spatial location determining devices 230 can include a personal communications device 112, an ear-worn device accessory 114, or another type of device with locating capabilities 212.

The spatial location determining devices 230 can interface with various devices/systems in order to determine current spatial location via coordinates, referential signal, referential device, or the like. By way of example, the spatial location determining devices 230 can interface with one or more of a device-to-device location service 242, a BLUETOOTH® beacon 244, a cell tower 246 (or triangulation with multiple cell towers), a WIFI® router 248, a satellite 250 (GPS L1/L2, GLONASS G1/G2, BeiDou B1/B2, Galileo E1/E5b, SBAS, or the like), or a telecoil loop cable 224, amongst other devices/systems. It will be appreciated that these specific examples are not exclusive and that various other techniques of determining location are also contemplated herein. In some embodiments, the spatial location determining device may determine location to a level of accuracy of 10 meters, 5 meters, 1 meter, 50 centimeters, 10 centimeters, 5 centimeters, or less, or a distance falling within a range between any of the foregoing.

In various embodiments, the ear-worn device 110 is physically separate from but in wireless communication with a spatial locator circuit/device. However, in other various embodiments, the ear-worn device 110 is physically integrated with a spatial locator circuit/device the spatial locator circuit. In some embodiments, the spatial locator circuit forms a part of a personal communications device 112.

In various embodiments, the spatial locator circuit can include a satellite signal receiver circuit. In various embodiments, the spatial locator circuit can include a device-to-device locator circuit. In various embodiments, the spatial locator circuit can include an electromagnetic sensor to detect the presence of a telecoil loop cable 224.

Figure 3:
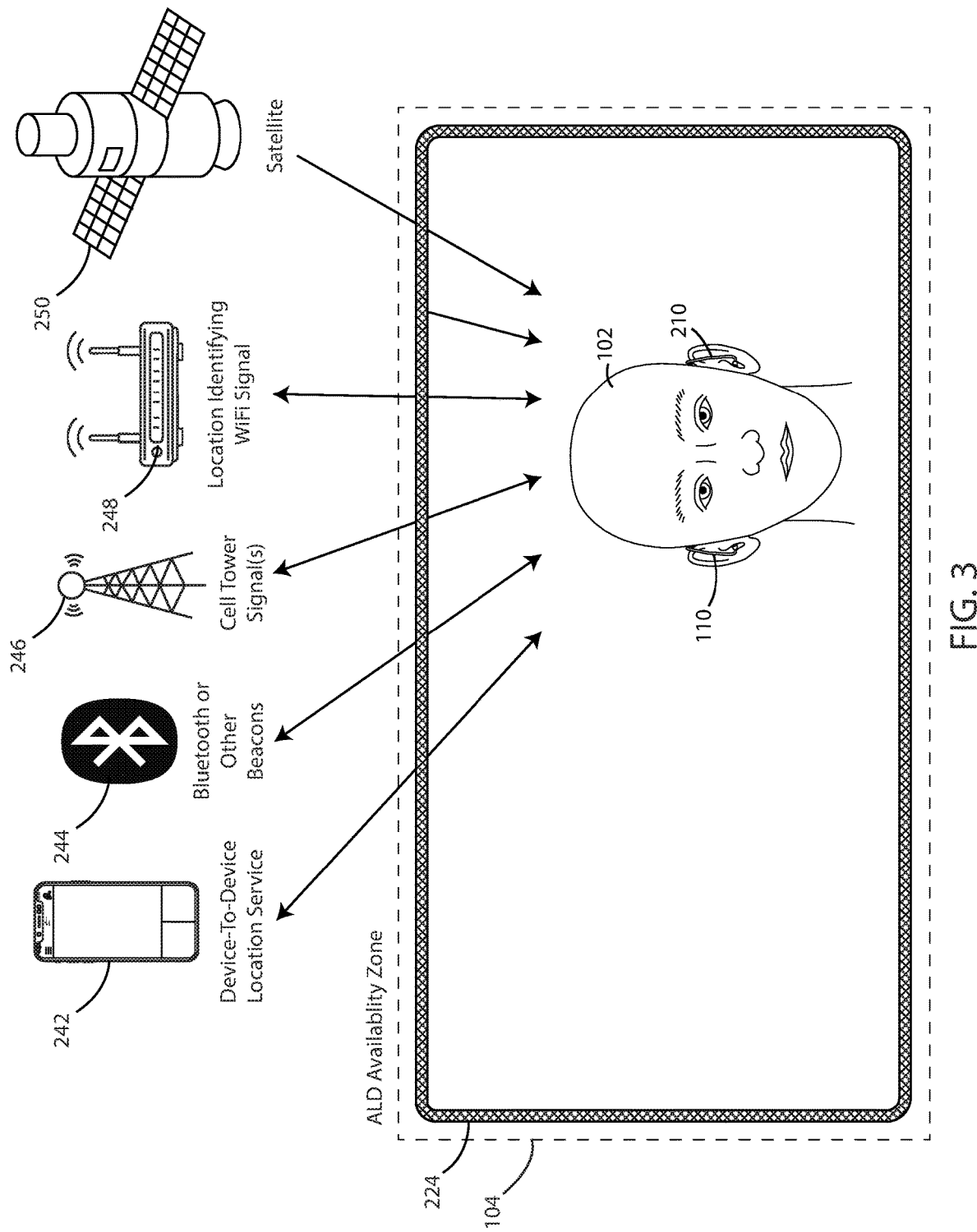
FIG. 3 is a schematic view of components of a hearing assistance system in accordance with various embodiments herein.

It will be appreciated that in some embodiments an ear-worn device 110 can include a spatial locator circuit and therefore directly determine spatial location. Referring now to FIG. 3, a schematic view of components of a hearing assistance system is shown in accordance with various embodiments herein. In this view, an ear-worn device wearer 102 is shown inside of an ALD availability zone 104.

The hearing assistance system includes an ear-worn device 110. In this embodiment, the hearing assistance system also includes a second ear-worn device 210 (however, various hearing assistance systems herein may only include a single ear-worn device).

In this embodiment, at least one of the ear-worn device 110 or the second ear-worn device 210 can directly interface with one or more of a device-to-device location service 242, a BLUETOOTH® beacon 244, a cell tower 246, a WIFI® router 248, a satellite 250, or a telecoil loop cable 224, amongst other devices/systems. Thus, in various embodiments herein, the spatial location circuit can be integrated within a housing with the ear-worn device 110.

Figure 4:
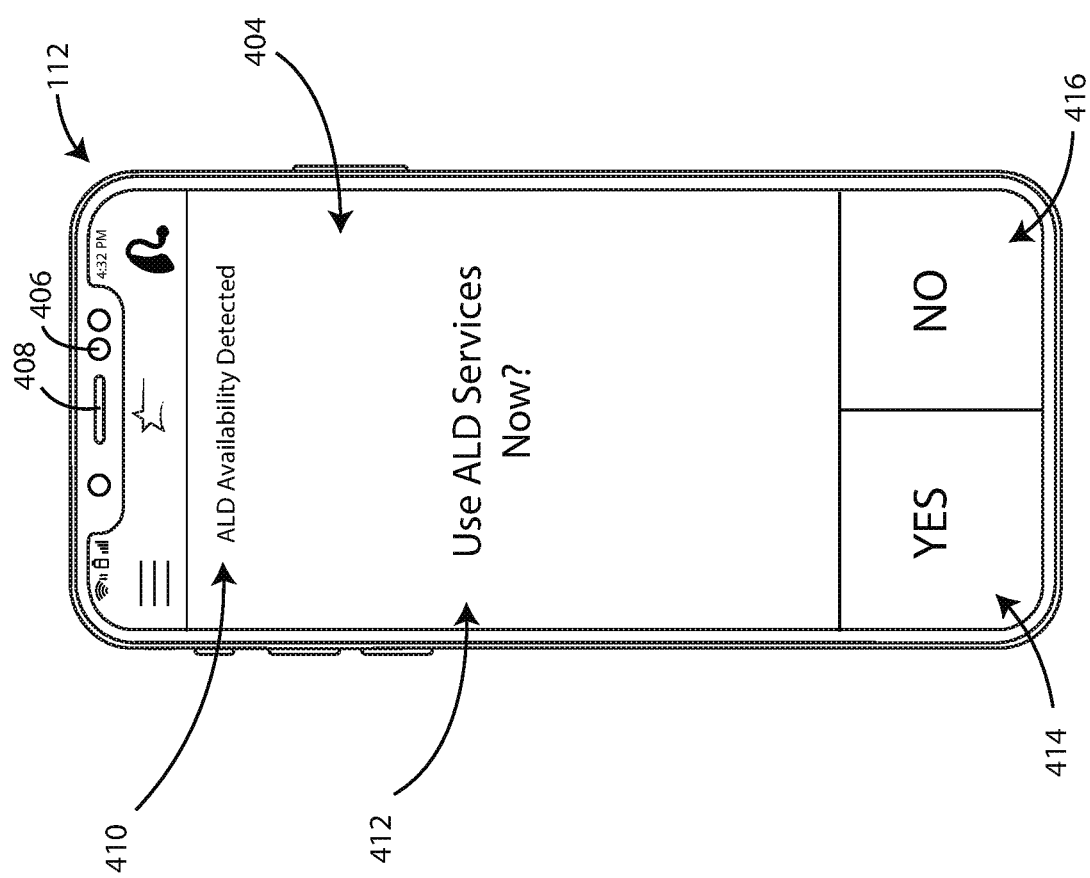
FIG. 4 is a schematic view of a personal communications device in accordance with various embodiments herein.

Various notifications and/or queries can be presented to an ear-worn device wearer in the context of system operation herein. Referring now to FIG. 4, a schematic view of a personal communications device 112 is shown in accordance with various embodiments herein. The personal communications device 112 includes a speaker 408. The personal communications device 112 also includes a camera 406. The personal communications device 112 also includes a display screen 404. Various pieces of information (data, notifications, queries, etc.) can be displayed on the display screen 404.

The personal communications device 112 can include various user interface features on the display screen 404. By way of example, the personal communications device 112 can include a first user interface button 414. The personal communications device 112 can also include a second user interface button 416. In this example, the personal communications device 112 also includes a notification 410. The personal communications device 112 also includes a query 412. In this case, the ear-worn device wearer can respond to the query 412 by interfacing with one of the buttons.

In various embodiments, the hearing assistance system (described further below) sends a notification 410 to the ear-worn device 110 wearer if the current spatial location 116 is found in the database (described further below) of spatial locations that offer assistive listening device services.

In various embodiments, wherein the hearing assistance system (described further below) prompts the ear-worn device 110 wearer to enter an ALD operating mode if the current spatial location 116 is found in the database (described further below) of spatial locations that offer assistive listening device services. Thus, in this example, the query 412 is directed to the question of whether or not the ear-worn device wearer would like the system to enter an operation mode wherein audio associated with the available ALD service is provided to the ear-worn device wearer through the ear-worn device(s) (e.g., an "ALD operating mode").

In various embodiments, the prompt is delivered through the ear-worn device 110, such as an audio or haptic prompt. However, the prompt can also (in addition or in replacement) be delivered through a personal communications device 112 in wireless communication with the ear-worn device 110. Thus, prompts herein can be aural, visual, haptic, or a combination thereof.

In various embodiments herein, the hearing assistance system monitors for a command from the ear-worn device 110 wearer to enter an assistive listening device mode (ALD operating mode) after sending a notification 410 to the ear-worn device 110 wearer.

Figure 5:
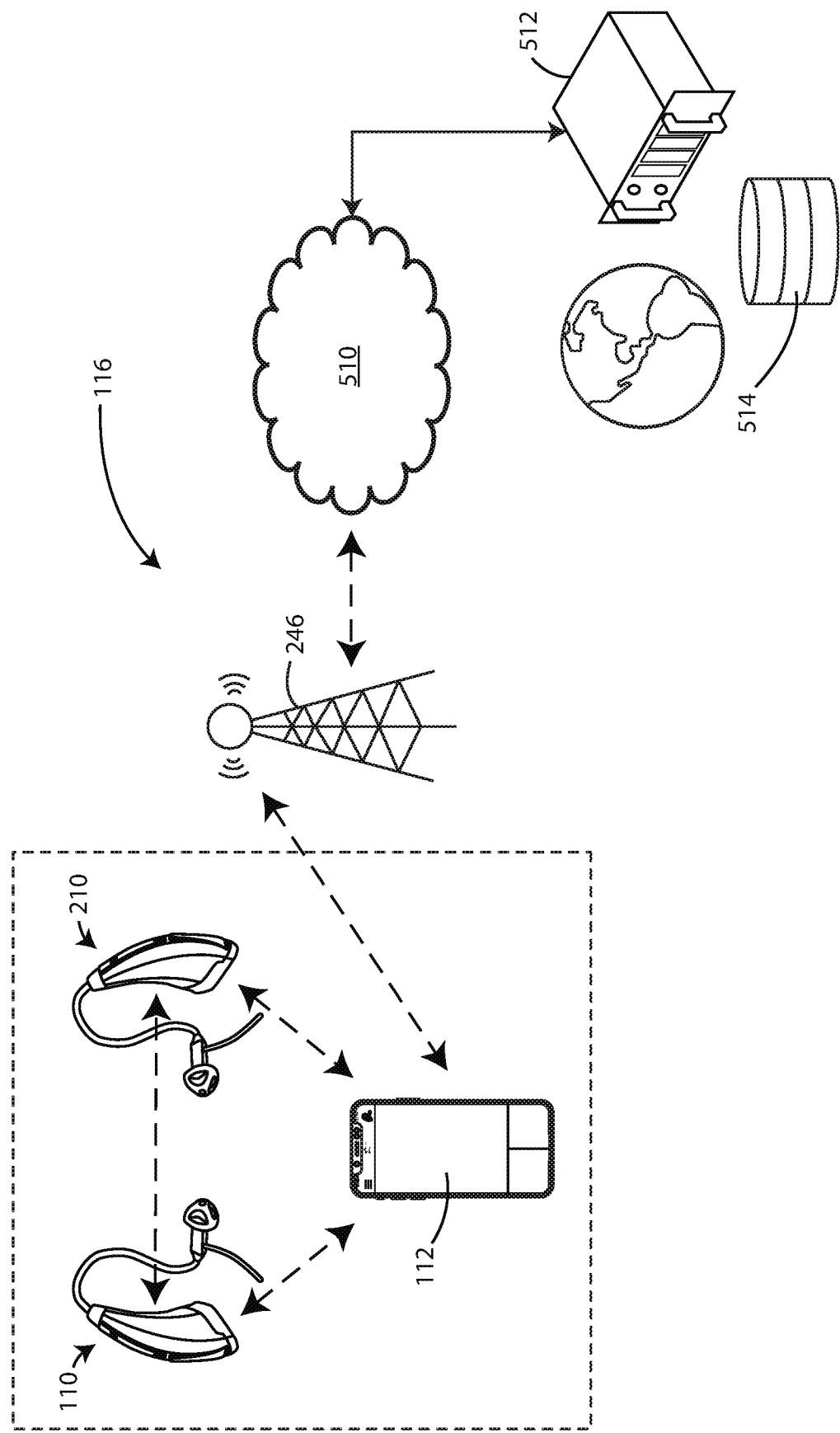
FIG. 5 is a schematic view of components of a hearing assistance system in accordance with various embodiments herein.

Hearing assistance systems herein can include many different components/devices. Referring now to FIG. 5, a schematic view of components of a hearing assistance system 502 is shown in accordance with various embodiments herein. In this example, the hearing assistance system 502 includes a first ear-worn device 110 and a second ear-worn device 210.

The hearing assistance system 502 also includes a database 514 including information on spatial locations that offer ALD services. In this example, the hearing assistance system 502 also includes a personal communications device 112. However, it will be appreciated that other embodiments herein may lack a personal communications device 112. Regardless, in some embodiments, a cell tower 246 can serve as a link to provide communication with a data conveyance/processing infrastructure. The hearing assistance system 502 also includes a server 512 (real or virtual). Components of the hearing assistance system 502 can be in communication with the server 512 and/or other components such as the database 514 through the cloud 510 (which can be a public or private data network, including but not limited to packet switched networks). In various embodiments, the database 514 can include information/records regarding spatial locations, referential signals, referential devices, and/or or the like that offer assistive listening device services.

In various embodiments, the hearing assistance system 502 sends a notification 410 to the ear-worn device 110 wearer if the current spatial location 116 is found in the database 514 of spatial locations that offer assistive listening device services. In various embodiments, the hearing assistance system 502 prompts the ear-worn device 110 wearer to enter an ALD operating mode if the current spatial location 116 is found in the database 514 of spatial locations that offer assistive listening device services. ALD operating modes can include various aspects. In various embodiments, ALD operating modes can include attenuating or eliminating amplification of sounds picked up with a microphone associated with the ear-worn devices 110, 210. In various embodiments, ALD operating modes can also include providing audio to the ear-worn device wearer as received from an ALD service. In some embodiments, ALD operating modes include providing audio only as received from an ALD service. In some embodiments, ALD operating modes include mixing audio as derived from microphones associated with ear-worn devices with audio received from an ALD service.

In various embodiments, the hearing assistance system 502 monitors for a command from the ear-worn device 110 wearer to enter an assistive listening device mode after sending a notification 410 to the ear-worn device 110 wearer.

In some embodiments, ear-worn devices and device wearers in the field can assist in building and/or updating databases of spatial locations that offer ALD services. For example, if an ear-worn device wearer turns on an ALD operating mode on their ear-worn device, it can be taken as evidence that the current spatial location of the ear-worn device wearer offers ALD services. In various embodiments, the hearing assistance system 502 can prompt the ear-worn device 110 wearer to assent to adding a current spatial location 116 to the database 514 of spatial locations that offer assistive listening device services if the hearing assistance device system detects the presence of assistive listening device ALD services and/or the initiation of an ALD operating mode in the current spatial location 116. If the device wearer assents, then the current spatial location (by coordinates, referential signal, referential device, etc.) can be added to the database as offering ALD services. In some embodiments, a server or other processing resource associated with the database may wait to add the current spatial location to the database until a threshold number (2, 3, 4, 5, 10, 20, etc.) of individual device wearers have tried to add it (e.g., in some cases, more than a single device wearer must add the location to the database before it is stored in such a manner to later be received by other device wearers in order to avoid issues with spurious/accidental additions).

As described above, in some embodiments, the hearing assistance system can query the device wearer. For example, the hearing assistance system can query the user as to whether the current location of the ear-worn device wearer should be added to the database as a spatial location offering ALD services.

Figure 6:
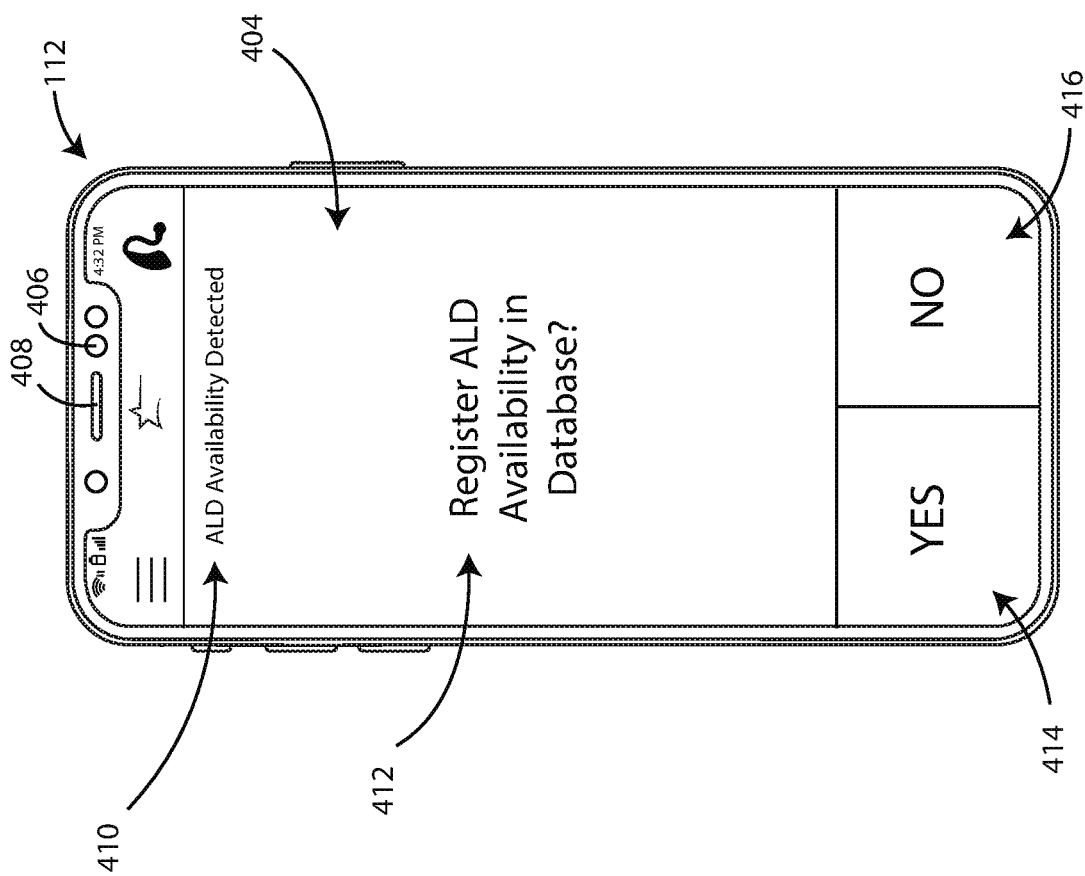
FIG. 6 is a schematic view of a personal communications device in accordance with various embodiments herein.

Referring now to FIG. 6, a schematic view of a personal communications device 112 is shown in accordance with various embodiments herein. As before, the personal communications device 112 includes a speaker 408 (though it will be appreciated that some embodiments of personal communications devices herein may lack various of the components described herein). The personal communications device 112 also includes a camera 406. The personal communications device 112 also includes a first user interface button 414 and a second user interface button 416. The personal communications device 112 also includes a display screen 404. The personal communications device 112 also includes a notification 410. The personal communications device 112 also includes a query 412.

In various embodiments, the hearing assistance system 502 prompts the ear-worn device 110 wearer to assent to adding a current spatial location 116 to the database 514 of spatial locations that offer assistive listening device services if the hearing assistance device system detects the presence of assistive listening device (ALD) services in the current spatial location 116 or if the device wearer activates an ALD mode on the ear-worn device 110.

However, in other various embodiments, the hearing assistance system 502 may not prompt the ear-worn device 110 wearer to assent to adding a current spatial location 116 to the database 514 of spatial locations that offer assistive listening device services if the hearing assistance device system detects the presence of assistive listening device (ALD) services in the current spatial location 116. Rather, in some embodiments, the system may simply automatically send a request to add the current spatial location 116 to the database.

In some embodiments, if multiple requests to add the current spatial location 116 to the database are received at the database or other computing resource interfacing with the database (assented or automatic, based on detection of ALD services or device wearers activating ALD modes), then this can be taken as an indication that the current spatial location 116 is actually one that offers ALD services. The precise threshold for a number of requests to be received before the current spatial location is actually added to the database can vary. For example, it could be 1, 2, 3, 4, 5, 10, 20, 30, 50 or more, or an amount falling within a range between any of the foregoing. In various embodiments, the requests need not be simultaneous. For example, the system can keep a count over time and if the number hits the threshold amount then the location can be added to the database. However, in some embodiments, requests older than a certain amount of time can be discounted or discarded. For example, requests older than 3, 6, or 12 months can be discarded and not be counted toward meeting the threshold number of requests.

Figure 7:
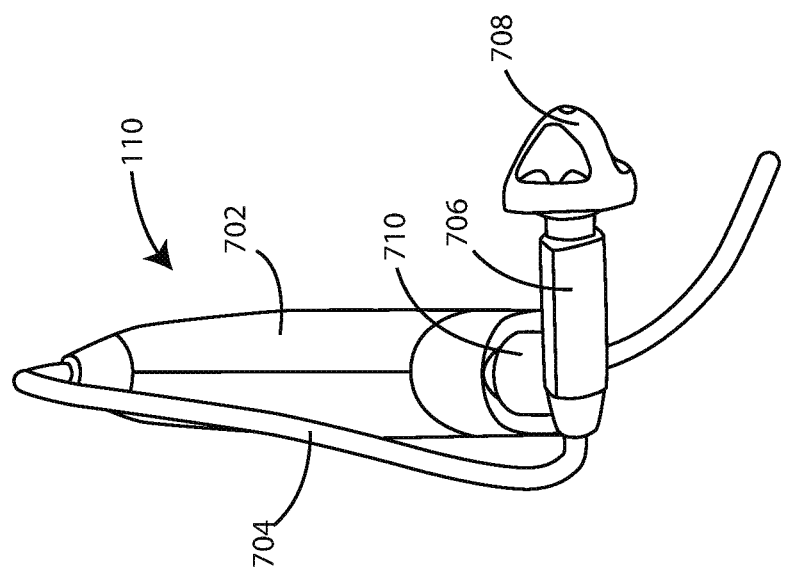
FIG. 7 is a schematic view of an ear-worn device in accordance with various embodiments herein.

Referring now to FIG. 7, a schematic view of an ear-worn device 110 is shown in accordance with various embodiments herein. The ear-worn device 110 can include a hearing device housing 702. The hearing device housing 702 can define a battery compartment 710 into which a battery can be disposed to provide power to the device. The ear-worn device 110 can also include a receiver 706 adjacent to an earbud 708. The receiver 706 an include a component that converts electrical impulses into sound, such as an electroacoustic transducer, speaker, or loud speaker. Such components can be used to generate an audible stimulus in various embodiments herein. A cable 704 or connecting wire can include one or more electrical conductors and provide electrical communication between components inside of the hearing device housing 702 and components inside of the receiver 706.

The ear-worn device 110 shown in FIG. 7 is a receiver-in-canal type device and thus the receiver is designed to be placed within the ear canal. However, it will be appreciated that may different form factors for ear-worn devices are contemplated herein. As such, ear-worn devices herein can include, but are not limited to, behind-the-ear (BTE), in-the-ear (ITE), in-the-canal (ITC), invisible-in-canal (IIC), receiver-in-canal (RIC), receiver in-the-ear (RITE) and completely-in-the-canal (CIC) type hearing assistance devices.

Ear-worn devices of the present disclosure can incorporate an antenna arrangement coupled to a high-frequency radio, such as a 2.4 GHz radio. The radio can conform to an IEEE 802.11 (e.g., WIFI®) or BLUETOOTH® (e.g., BLE, BLUETOOTH® 4.2 or 5.0) specification, for example. It is understood that ear-worn devices of the present disclosure can employ other radios, such as a 900 MHz radio. Ear-worn devices of the present disclosure can be configured to receive streaming audio (e.g., digital audio data or files) from an electronic or digital source. Representative electronic/digital sources (also referred to herein as accessory devices) include an assistive listening system, a TV streamer, a radio, a smartphone, a cell phone/entertainment device (CPED) or other electronic device that serves as a source of digital audio data or files.

Figure 8:
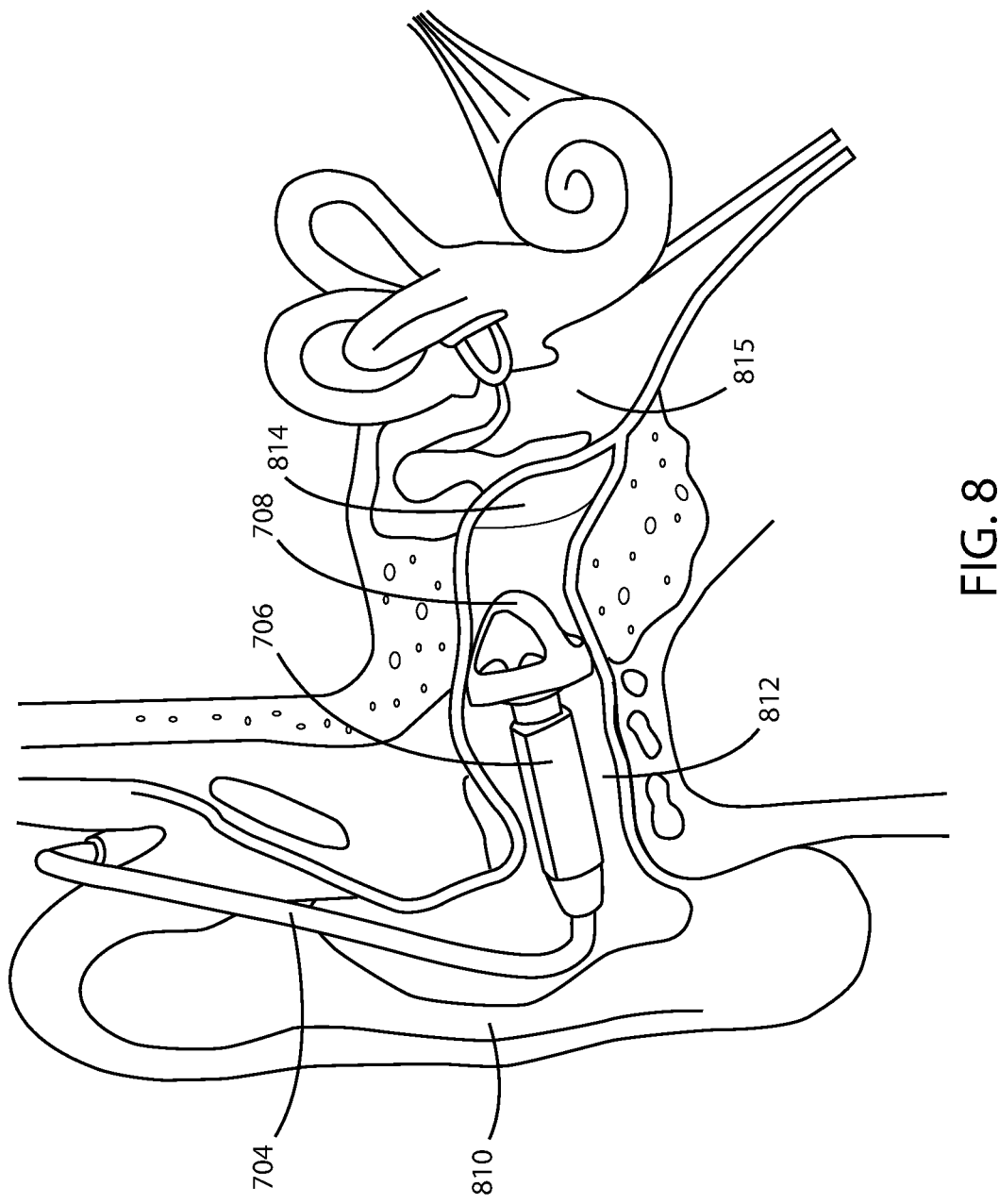
FIG. 8 is a schematic view of an ear-worn device within an ear of a device wearer in accordance with various embodiments herein.

As mentioned above, the ear-worn device 110 shown in FIG. 7 can be a receiver-in-canal type device and thus the receiver is designed to be placed within the ear canal. Referring now to FIG. 8, a schematic view is shown of an ear-worn device 110 disposed within the ear of a subject in accordance with various embodiments herein. In this view, the receiver 706 and the earbud 708 are both within the ear canal 812, but do not directly contact the tympanic membrane 814. The hearing device housing is mostly obscured in this view behind the pinna 810, but it can be seen that the cable 704 passes over the top of the pinna 810 and down to the entrance to the ear canal 812.

Figure 9:
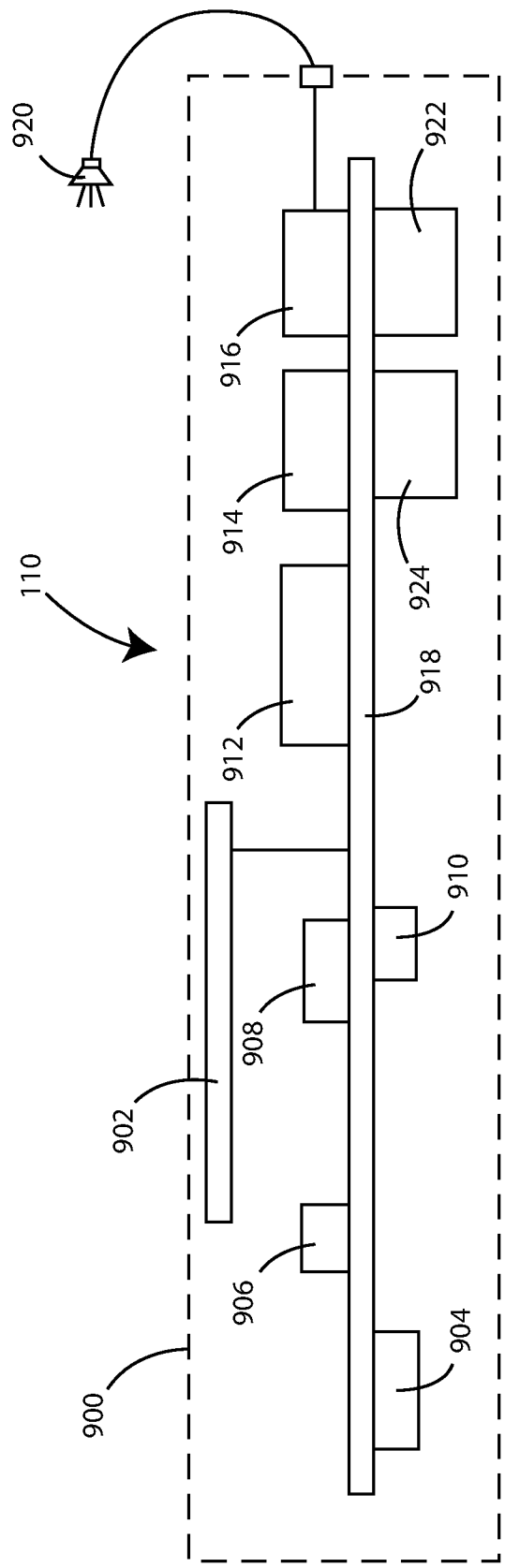
FIG. 9 is a schematic block diagram of components of an ear-worn device in accordance with various embodiments herein.

Referring now to FIG. 9, a schematic block diagram of components of an ear-worn device is shown in accordance with various embodiments herein. The block diagram of FIG. 9 represents a generic ear-worn device for purposes of illustration. The ear-worn device 110 shown in FIG. 9 includes several components electrically connected to a flexible mother circuit 918 (e.g., flexible mother board) which is disposed within housing 900. A power supply circuit 904 can include a battery and can be electrically connected to the flexible mother circuit 918 and provides power to the various components of the ear-worn device 110. One or more microphones 906 are electrically connected to the flexible mother circuit 918, which provides electrical communication between the microphones 906 and a digital signal processor (DSP) 912. Among other components, the DSP 912 incorporates or is coupled to audio signal processing circuitry configured to implement various functions described herein. A sensor package 914 can be coupled to the DSP 912 via the flexible mother circuit 918. The sensor package 914 can include one or more different specific types of sensors such as those described in greater detail below. One or more user switches 910 (e.g., on/off, volume, mic directional settings) are electrically coupled to the DSP 912 via the flexible mother circuit 918.

An audio output device 916 is electrically connected to the DSP 912 via the flexible mother circuit 918. In some embodiments, the audio output device 916 comprises a speaker (coupled to an amplifier). In other embodiments, the audio output device 916 comprises an amplifier coupled to an external receiver 920 adapted for positioning within an ear of a wearer. The external receiver 920 can include an electroacoustic transducer, speaker, or loud speaker. The ear-worn device 110 may incorporate a communication device 908 coupled to the flexible mother circuit 918 and to an antenna 902 directly or indirectly via the flexible mother circuit 918. The communication device 908 can be a BLUETOOTH® transceiver, such as a BLE (BLUETOOTH® low energy) transceiver or other transceiver(s) (e.g., an IEEE 802.11 compliant device). The communication device 908 can be configured to communicate with one or more external devices, such as those discussed previously, in accordance with various embodiments. In various embodiments, the communication device 908 can be configured to communicate with an external visual display device such as a smart phone, a video display screen, a tablet, a computer, or the like.

In various embodiments, the ear-worn device 110 can also include a control circuit 922 and a memory storage device 924. The control circuit 922 can be in electrical communication with other components of the device. In some embodiments, a clock circuit 926 can be in electrical communication with the control circuit. The control circuit 922 can execute various operations, such as those described herein. The control circuit 922 can include various components including, but not limited to, a microprocessor, a microcontroller, an FPGA (field-programmable gate array) processing device, an ASIC (application specific integrated circuit), or the like. The memory storage device 924 can include both volatile and non-volatile memory. The memory storage device 924 can include ROM, RAM, flash memory, EEPROM, SSD devices, NAND chips, and the like. The memory storage device 924 can be used to store data from sensors as described herein and/or processed data generated using data from sensors as described herein.

It will be appreciated that various of the components described in FIG. 9 can be associated with separate devices and/or accessory devices to the ear-worn device. By way of example, microphones can be associated with separate devices and/or accessory devices. Similarly, audio output devices can be associated with separate devices and/or accessory devices to the ear-worn device.

Accessory devices herein can include various different components. In some embodiments, the accessory device can be a personal communications device, such as a smartphone. However, the accessory device can also be other things such as a wearable device, a handheld computing device, a dedicated location determining device (such as a handheld GPS unit), or the like.

Figure 10:
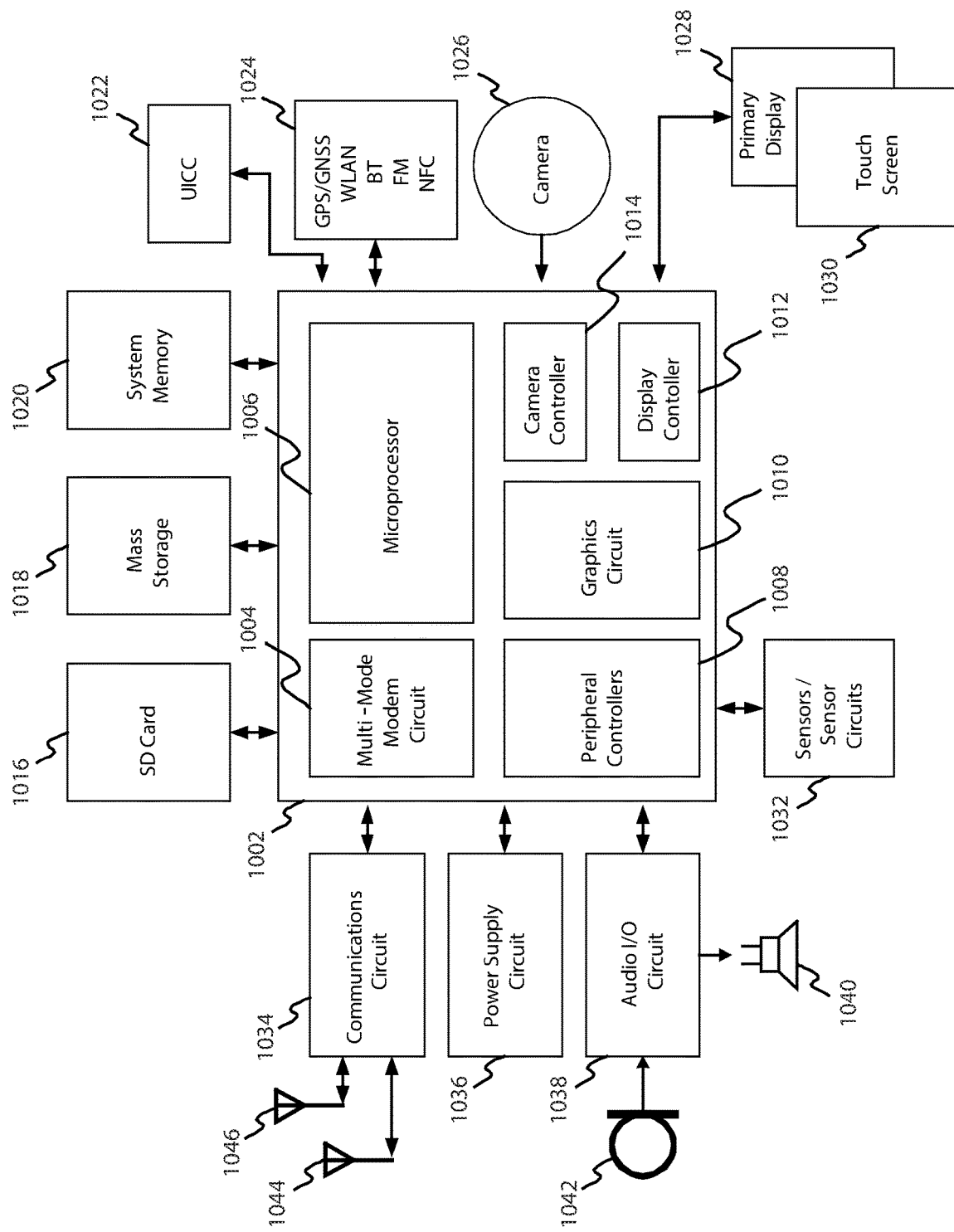
FIG. 10 is a schematic block diagram of components of an exemplary accessory device in accordance with various embodiments herein.

Referring now to FIG. 10, a schematic block diagram is shown of components of an accessory device (which could be a personal communications device or another type of accessory device) in accordance with various embodiments herein. This block diagram is just provided by way of illustration and it will be appreciated that accessory devices can include greater or lesser numbers of components. The accessory device in this example can include a control circuit 1002. The control circuit 1002 can include various components which may or may not be integrated. In various embodiments, the control circuit 1002 can include a microprocessor 1006, which could also be a microcontroller, FPGA, ASIC, or the like. The control circuit 1002 can also include a multi-mode modem circuit 1004 which can provide communications capability via various wired and wireless standards. The control circuit 1002 can also include various sensors/sensor circuits 1032. The control circuit 1002 can also include a graphics circuit 1010, a camera controller 1014, and a display controller 1012. In various embodiments, the control circuit 1002 can interface with an SD card 1016, mass storage 1018, and system memory 1020. In various embodiments, the control circuit 1002 can interface with universal integrated circuit card (UICC) 1022. A spatial location determining circuit can be included and can take the form of an integrated circuit 1024 that can include components for receiving signals from GPS, GLONASS, BeiDou, Galileo, SBAS, WLAN, BT, FM, and NFC type protocols. In various embodiments, the accessory device can include a camera 1026. In various embodiments, the control circuit 1002 can interface with a primary display 1028 that can also include a touch screen 1030. In various embodiments, an audio I/O circuit can interface with the control circuit 1002 as well as a microphone 1042 and a speaker 1040. In various embodiments, a power supply circuit 1036 can interface with the control circuit 1002 and/or various other circuits herein in order to provide power to the system. In various embodiments, a communications circuit 1034 can be in communication with the control circuit 1002 as well as one or more antennas (1044, 1046).

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method of operating a hearing assistance system is included. The method can include determining a current spatial location of one or more components of a hearing assistance system. The method can also include comparing the current spatial location against entries in a database of spatial locations that offer assistive listening device services. The method can also include sending a notification to an ear-worn device and/or an ear-worn device wearer if the current spatial location is found in the database of spatial locations that offer assistive listening device services.

In an embodiment of the method, the hearing assistance system prompts the ear-worn device wearer to enter an ALD operating mode if the current spatial location is found in the database of spatial locations that offer assistive listening device services.

In an embodiment of the method, the hearing assistance system monitors for a command from the ear-worn device wearer to enter an assistive listening device mode after sending a notification to the ear-worn device wearer.

In an embodiment of the method, the hearing assistance system prompts the ear-worn device wearer to assent to adding a current spatial location to the database of spatial locations that offer assistive listening device services if the hearing assistance device system detects the presence of assistive listening device (ALD) services in the current spatial location.

In an embodiment, a method of operating a hearing assistance system is included herein. In some embodiments, the method can include determining a current spatial location of one or more components of a hearing assistance system, the hearing assistance system comprising an ear-worn device. The method can also include detecting a device wearer command for the ear-worn device to enter an ALD services mode. Detecting a device wearer command can be performed in various ways. In some embodiments, it can be as simple as receiving a user input for a command to enter an ALD services mode. The method can also include sending a request to add the current spatial location to a database of spatial locations that offer assistive listening device services. In an embodiment, the method can also include prompting the ear-worn device wearer to assent to send the request.

Further Embodiments

In a first aspect, a hearing assistance system is included having an ear-worn device can include a control circuit, a sensor package in signal communication with the control circuit, a power supply circuit in electrical communication with the control circuit, and a spatial locator circuit in communication with the ear-worn device. The spatial locator circuit can detect a current spatial location. The system can compare the current spatial location against entries in a database of spatial locations that offer assistive listening device services. The system can send a notification to the ear-worn device and/or ear-worn device wearer if the current spatial location is found in the database of spatial locations that offer assistive listening device services.

In a second aspect, in addition to one or more of the preceding or following aspects, or in the alternative to some aspects, the spatial location circuit can be integrated within a housing with the ear-worn device.

In a third aspect, in addition to one or more of the preceding or following aspects, or in the alternative to some aspects, the ear-worn device can be physically separate from but in wireless communication with the spatial locator circuit.

In a fourth aspect, in addition to one or more of the preceding or following aspects, or in the alternative to some aspects, the hearing assistance system can send a notification to the ear-worn device wearer if the current spatial location is found in the database of spatial locations that offer assistive listening device services.

In a fifth aspect, in addition to one or more of the preceding or following aspects, or in the alternative to some aspects, the hearing assistance system can prompt the ear-worn device wearer to enter an ALD operating mode if the current spatial location is found in the database of spatial locations that offer assistive listening device services.

In a sixth aspect, in addition to one or more of the preceding or following aspects, or in the alternative to some aspects, the prompt can be delivered through the ear-worn device.

In a seventh aspect, in addition to one or more of the preceding or following aspects, or in the alternative to some aspects, the prompt can be delivered through a personal communications device in wireless communication with the ear-worn device.

In an eighth aspect, in addition to one or more of the preceding or following aspects, or in the alternative to some aspects, the hearing assistance system monitors for a command from the ear-worn device wearer to enter an assistive listening device mode after sending a notification to the ear-worn device wearer.

In a ninth aspect, in addition to one or more of the preceding or following aspects, or in the alternative to some aspects, the spatial locator circuit forms a part of a personal communications device.

In a tenth aspect, in addition to one or more of the preceding or following aspects, or in the alternative to some aspects, the spatial locator circuit can include a satellite signal receiver circuit.

In an eleventh aspect, in addition to one or more of the preceding or following aspects, or in the alternative to some aspects, the spatial locator circuit can include a device-to-device locator circuit.

In a twelfth aspect, in addition to one or more of the preceding or following aspects, or in the alternative to some aspects, the spatial locator circuit can include an electromagnetic sensor to detect the presence of a telecoil loop cable.

In a thirteenth aspect, in addition to one or more of the preceding or following aspects, or in the alternative to some aspects, the hearing assistance system can prompt the ear-worn device wearer to assent to adding a current spatial location to the database of spatial locations that offer assistive listening device services if the hearing assistance device system detects the presence of assistive listening device (ALD) services in the current spatial location.

In a fourteenth aspect, in addition to one or more of the preceding or following aspects, or in the alternative to some aspects, the assistive listening device (ALD) services can be selected from the group consisting of a telecoil loop system, an FM transmitter/receiver system, a personal audio device system, a BLUETOOTH® ALD system, and an infrared ALD system.

In a fifteenth aspect, an ear-worn device is included having a control circuit, a sensor package in signal communication with the control circuit, a power supply circuit in electrical communication with the control circuit, and a spatial locator circuit in signal communication with the control circuit. The spatial locator circuit can detect a current spatial location of the ear-worn device. The control circuit can compare the current spatial location against entries in a database of spatial locations that offer assistive listening device services. The ear-worn device can initiate a notification to the ear-worn device wearer if the current spatial location is found in the database of spatial locations that offer assistive listening device services.

In a sixteenth aspect, an ear-worn device accessory is included having a control circuit, a power supply circuit in electrical communication with the control circuit, and a spatial locator circuit in signal communication with the control circuit. The spatial locator circuit can detect a current spatial location of the ear-worn device accessory. The control circuit can compare the current spatial location against entries in a database of spatial locations that offer assistive listening device services. The ear-worn device accessory can initiate a notification to an ear-worn device wearer if the current spatial location is found in the database of spatial locations that offer assistive listening device services.

In a seventeenth aspect, in addition to one or more of the preceding or following aspects, or in the alternative to some aspects, the ear-worn device accessory can include or be a personal communications device.

In an eighteenth aspect, in addition to one or more of the preceding or following aspects, or in the alternative to some aspects, the ear-worn device accessory can initiate a notification to an ear-worn device if the current spatial location is found in the database of spatial locations that offer assistive listening device services.

In a nineteenth aspect, a method of operating a hearing assistance system is included, the method including determining a current spatial location of one or more components of a hearing assistance system, comparing the current spatial location against entries in a database of spatial locations that offer assistive listening device services, and sending a notification to an ear-worn device and/or an ear-worn device wearer if the current spatial location is found in the database of spatial locations that offer assistive listening device services.

In a twentieth aspect, in addition to one or more of the preceding or following aspects, or in the alternative to some aspects, wherein the hearing assistance system prompts the ear-worn device wearer to enter an ALD operating mode if the current spatial location is found in the database of spatial locations that offer assistive listening device services.

In a twenty-first aspect, in addition to one or more of the preceding or following aspects, or in the alternative to some aspects, the hearing assistance system monitors for a command from the ear-worn device wearer to enter an assistive listening device mode after sending a notification to the ear-worn device wearer.

In a twenty-second aspect, in addition to one or more of the preceding or following aspects, or in the alternative to some aspects, the hearing assistance system prompts the ear-worn device wearer to assent to adding a current spatial location to the database of spatial locations that offer assistive listening device services if the hearing assistance device system detects the presence of assistive listening device (ALD) services in the current spatial location.

In a twenty-third aspect, in addition to one or more of the preceding or following aspects, or in the alternative to some aspects, a method of operating a hearing assistance system is included. The method can include determining a current spatial location of one or more components of a hearing assistance system, the hearing assistance system comprising an ear-worn device. The method can also include detecting a device wearer command for the ear-worn device to enter an ALD services mode. The method can also include sending a request to add the current spatial location to a database of spatial locations that offer assistive listening device services.

In a twenty-fourth aspect, in addition to one or more of the preceding or following aspects, or in the alternative to some aspects, a method herein can include prompting the ear-worn device wearer to assent to send the request.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:
1. A hearing assistance system comprising:
an ear-worn device comprising
a control circuit;
a sensor package in signal communication with the control circuit;
a power supply circuit in electrical communication with the control circuit;
a spatial locator circuit in communication with the ear-worn device;
wherein the spatial locator circuit detects a current spatial location;

wherein the system compares the current spatial location against entries in a database of spatial locations that offer assistive listening device services;

wherein the system sends a notification to the ear-worn device and/or ear-worn device wearer if the current spatial location is found in the database of spatial locations that offer assistive listening device services.

2. The hearing assistance system of claim 1, wherein the spatial location circuit is integrated within a housing with the ear-worn device.

3. The hearing assistance system of claim 1, wherein the ear-worn device is physically separate from but in wireless communication with the spatial locator circuit.

4. The hearing assistance system of claim 1, wherein the hearing assistance system sends a notification to the ear-worn device wearer if the current spatial location is found in the database of spatial locations that offer assistive listening device services.

5. The hearing assistance system of claim 1, wherein the hearing assistance system prompts the ear-worn device wearer to enter an ALD operating mode if the current spatial location is found in the database of spatial locations that offer assistive listening device services.

6. The hearing assistance system of claim 5, wherein the prompt is delivered through the ear-worn device.

7. The hearing assistance system of claim 5, wherein the prompt is delivered through a personal communications device in wireless communication with the ear-worn device.

8. The hearing assistance system of claim 1, wherein the hearing assistance system monitors for a command from the ear-worn device wearer to enter an assistive listening device mode after sending a notification to the ear-worn device wearer.

9. The hearing assistance system of claim 1, the spatial locator circuit forming a part of a personal communications device.

10. The hearing assistance system of claim 1, the spatial locator circuit comprising a satellite signal receiver circuit.

11. The hearing assistance system of claim 1, the spatial locator circuit comprising a device-to-device locator circuit.

12. The hearing assistance system of claim 1, the spatial locator circuit comprising an electromagnetic sensor to detect the presence of a telecoil loop cable.

13. The hearing assistance system of claim 1, wherein the hearing assistance system prompts the ear-worn device wearer to assent to adding a current spatial location to the database of spatial locations that offer assistive listening device services if the hearing assistance device system detects the presence of assistive listening device (ALD) services in the current spatial location.

14. The hearing assistance system of claim 13, wherein the assistive listening device (ALD) services are selected from the group consisting of a telecoil loop system, an FM transmitter/receiver system, a personal audio device system, a BLUETOOTH ALD system, and an infrared ALD system.

15. An ear-worn device accessory comprising:
a control circuit;
a power supply circuit in electrical communication with the control circuit;
a spatial locator circuit in signal communication with the control circuit;
wherein the spatial locator circuit detects a current spatial location of the ear-worn device accessory;
wherein the control circuit compares the current spatial location against entries in a database of spatial locations that offer assistive listening device services;
wherein the ear-worn device accessory initiates a notification to an ear-worn device wearer if the current spatial location is found in the database of spatial locations that offer assistive listening device services.

16. The ear-worn device accessory of claim 15, wherein the ear-worn device accessory initiates a notification to an ear-worn device if the current spatial location is found in the database of spatial locations that offer assistive listening device services.

17. A method of operating a hearing assistance system comprising:
determining a current spatial location of one or more components of a hearing assistance system;
comparing the current spatial location against entries in a database of spatial locations that offer assistive listening device services;
sending a notification to an ear-worn device and/or an ear-worn device wearer if the current spatial location is found in the database of spatial locations that offer assistive listening device services.

18. The method of claim 17, wherein the hearing assistance system prompts the ear-worn device wearer to enter an ALD operating mode if the current spatial location is found in the database of spatial locations that offer assistive listening device services.

19. The method of claim 17, wherein the hearing assistance system monitors for a command from the ear-worn device wearer to enter an assistive listening device mode after sending a notification to the ear-worn device wearer.

20. The method of claim 17, wherein the hearing assistance system prompts the ear-worn device wearer to assent to adding a current spatial location to the database of spatial locations that offer assistive listening device services if the hearing assistance device system detects the presence of assistive listening device (ALD) services in the current spatial location.

\* \* \* \* \*